(12) United States Patent
Mulligan, Jr.

(10) Patent No.: US 7,467,107 B1
(45) Date of Patent: Dec. 16, 2008

(54) WEB-BASED SYSTEM AND METHOD FOR HEDGE FUND COMPLIANCE

(75) Inventor: William G. Mulligan, Jr., New York, NY (US)

(73) Assignee: The Mulligan Compliance Group LLC, New York, NY (US)

( * ) Notice: Subject to any disclaimer, the term of this patent is extended or adjusted under 35 U.S.C. 154(b) by 437 days.

(21) Appl. No.: 10/910,134

(22) Filed: Aug. 3, 2004

Related U.S. Application Data

(60) Provisional application No. 60/545,070, filed on Feb. 17, 2004.

(51) Int. Cl.
*G06Q 40/00* (2006.01)

(52) U.S. Cl. .................... 705/35; 705/36 R; 705/37

(58) Field of Classification Search ............. 705/35–37
See application file for complete search history.

(56) References Cited

U.S. PATENT DOCUMENTS

| | | | |
|---|---|---|---|
| 6,820,069 B1 * | 11/2004 | Kogan et al. | 706/46 |
| 2002/0138388 A1 | 9/2002 | Reiss | |
| 2002/0138407 A1 | 9/2002 | Lawrence et al. | |
| 2003/0115123 A1 * | 6/2003 | Lang | 705/36 |
| 2003/0177087 A1 | 9/2003 | Lawrence | |
| 2003/0204462 A1 * | 10/2003 | Eisler | 705/36 |
| 2003/0236742 A1 | 12/2003 | Lawrence | |
| 2004/0034593 A1 | 2/2004 | Toneguzzo et al. | |
| 2004/0054610 A1 * | 3/2004 | Amstutz et al. | 705/36 |
| 2004/0158612 A1 * | 8/2004 | Concannon | 709/206 |
| 2004/0177020 A1 * | 9/2004 | Alderman et al. | 705/36 |
| 2004/0193532 A1 * | 9/2004 | Lawrence | 705/37 |
| 2004/0249687 A1 * | 12/2004 | Lowell et al. | 705/7 |
| 2005/0125316 A1 * | 6/2005 | Levering et al. | 705/30 |
| 2005/0288941 A1 * | 12/2005 | DuBois et al. | 705/1 |
| 2006/0259385 A1 * | 11/2006 | Menken | 705/35 |
| 2007/0038551 A1 * | 2/2007 | Shah | 705/37 |

FOREIGN PATENT DOCUMENTS

GB    EP 1775678 A1 *    4/2007

* cited by examiner

*Primary Examiner*—Narayanswamy Subramanian
(74) *Attorney, Agent, or Firm*—K & L Gates LLP; Stephen C. Glazier

(57) ABSTRACT

A computer-based method for facilitating hedge fund compliance is disclosed. The method includes receiving input data descriptive of one or more aspects of a hedge fund management operation, analyzing the received input data with a computer, and generating at least one of (1) a compliance guide customized in accordance with fund management operation aspects, (2) a compliance manual customized in accordance with fund management operation aspects and including at least one written procedure for the hedge fund management operation, and (3) a compliance report customized for the hedge fund management operation. The step of analyzing includes determining one or more of a law and regulation applicable to the hedge find operation based on the received input data and categorizing some or all of the received input data according to the hedge fund management operation aspects. The hedge fund operation includes a hedge fund manager.

22 Claims, 7 Drawing Sheets

WEB-BASED SYSTEM AND METHOD FOR HEDGE FUND COMPLIANCE

CROSS REFERENCE TO RELATED APPLICATION

This application claims priority to U.S. Provisional Patent Application No. 60/545,070 filed on Feb. 17, 2004, which is incorporated herein in its entirety by this reference.

BACKGROUND

1. Field

Embodiments of the present invention relate generally to fund compliance tools. More specifically, embodiments of the invention relate to computer systems and methods for facilitating compliance with hedge fund regulations.

2. Description of Related Art

Numerous federal and state laws require that hedge fund (""find"") managers comply with regulations issued by various federal and state agencies. Example federal agencies include the Securities and Exchange Commission (SEC), the Commodity Futures Trading Commission (CFTC), the National Association of Securities Dealers (NASD), and the United States Treasury. Example state agencies include departments of banking and consumer fraud. Regulations promulgated by these agencies and others aim to protect investors in the funds by containing, among other things, provisions to promote investor awareness of risks associated with these kinds of investment vehicles.

Depending on their particular operational mode, finds and their managers may be subject to complex combinations of regulations of one, some, or all of the above exemplary agencies and/or other agencies. Additionally, the regulations themselves comprise a fluid, evolving body of laws, for they may be modified through, for example, opinion, amendment, or administrative ruling. Fund managers may be faced with a myriad of issues to address, such as investment management procedures, trading practices, personal trading guidelines, disclosure to clients and/or investors, custody/safeguarding of assets, record keeping, privacy policies, and disaster recovery/back-up plans. Also, many of the regulations for investment managers may be inapplicable to any particular investment manager. Hence, it is a challenge for a specific investment manager to focus on the relevant regulations, and maintain that focus on current versions of the applicable regulations.

In order to ensure compliance with regulations, fund managers have historically needed to expend much time, money, and effort to develop and maintain a compliance infrastructure and associated business practices. For instance, necessary legal research and preparation of documentation (e.g., required reports and documentation of compliance practices) may be extensive, time-consuming, and labor-intensive. Additionally, to respond to rapidly changing regulatory environments, find managers may need to seek costly on-site assistance from outside counsel and/or consultants.

Given the attendant costs and complexities, some fund managers have not achieved full compliance with applicable regulations. Moreover, such costs and complexities may act as barriers to entry, preventing competent individuals from serving as find managers, thus depriving investors of additional investment options in the marketplace.

SUMMARY

The following summary is intended to describe certain embodiments of the present invention. It does not encompass each and every embodiment, and should not be construed as limiting of the present invention.

Embodiments of the present invention provide computer-based methods, systems, and computer-readable mediums for facilitating compliance with hedge fund regulations.

According to various embodiments, the methods include receiving input data descriptive of one or more aspects of a hedge fund management operation, analyzing the received input data with a computer, and generating at least one of (1) a compliance guide customized in accordance with fund management operation aspects, (2) a compliance manual customized in accordance with fund management operation aspects and including at least one written procedure for the hedge fund management operation, and (3) a compliance report customized for the hedge fund management operation. The step of analyzing includes determining one or more of a law and regulation applicable to the hedge fund operation based on the received input data and categorizing some or all of the received input data according to the hedge fund management operation aspects. The hedge fund operation includes a hedge fund manager.

According to various embodiments, the systems include an analytical engine for analyzing received input data descriptive of one or more aspects of a fund management operation. The analysis includes a determination of one or more of a law and regulation applicable to the hedge fund operation based on the received input data and a categorization of some or all of the received input data according to the hedge fund management operation aspects. The systems further include a compliance guide generator for generating, based on the analysis of the analytical engine, a compliance guide customized for the hedge fund management operation. The systems further include a compliance manual generator for generating, based on the analysis of the analytical engine, a compliance manual customized for the hedge fund management operation. The compliance manual includes at least one written procedure for the hedge fund management operation. The systems further include a report generator for generating, based on the analysis of the analytical engine, at least one a compliance report customized for the hedge fund management operation. The hedge fund operation includes a hedge fund manager.

According to various embodiments, the computer-readable medium has encoded thereon a plurality of processor-executable instructions for receiving input data descriptive of one or more aspects of a hedge fund management operation, analyzing the received input data, and generating at least one of (1) a compliance guide customized for the hedge fund management operation, (2) a compliance manual customized for the hedge fund management operation and including written procedures for the hedge fund management operation, and (3) at least one compliance report customized for the hedge fund management operation. The step of analyzing includes determining a set of regulations applicable to the hedge fund operation based on the received input data and categorizing some or all of the received input data according to the one or more aspects. The hedge fund operation includes a hedge fund manager.

DETAILED DESCRIPTION

The following detailed description refers to the accompanying drawings that illustrate certain embodiments of the present invention. It may be appreciated that other embodiments are possible and that modifications may be made to the embodiments disclosed herein without departing from the spirit and scope of the present invention. Therefore, the following detailed description is not meant to limit the present invention. Rather, the scope of the present invention is defined by the appended claims.

An embodiment of the present invention is being developed by HedgeOp Compliance LLC.

Figure 1:
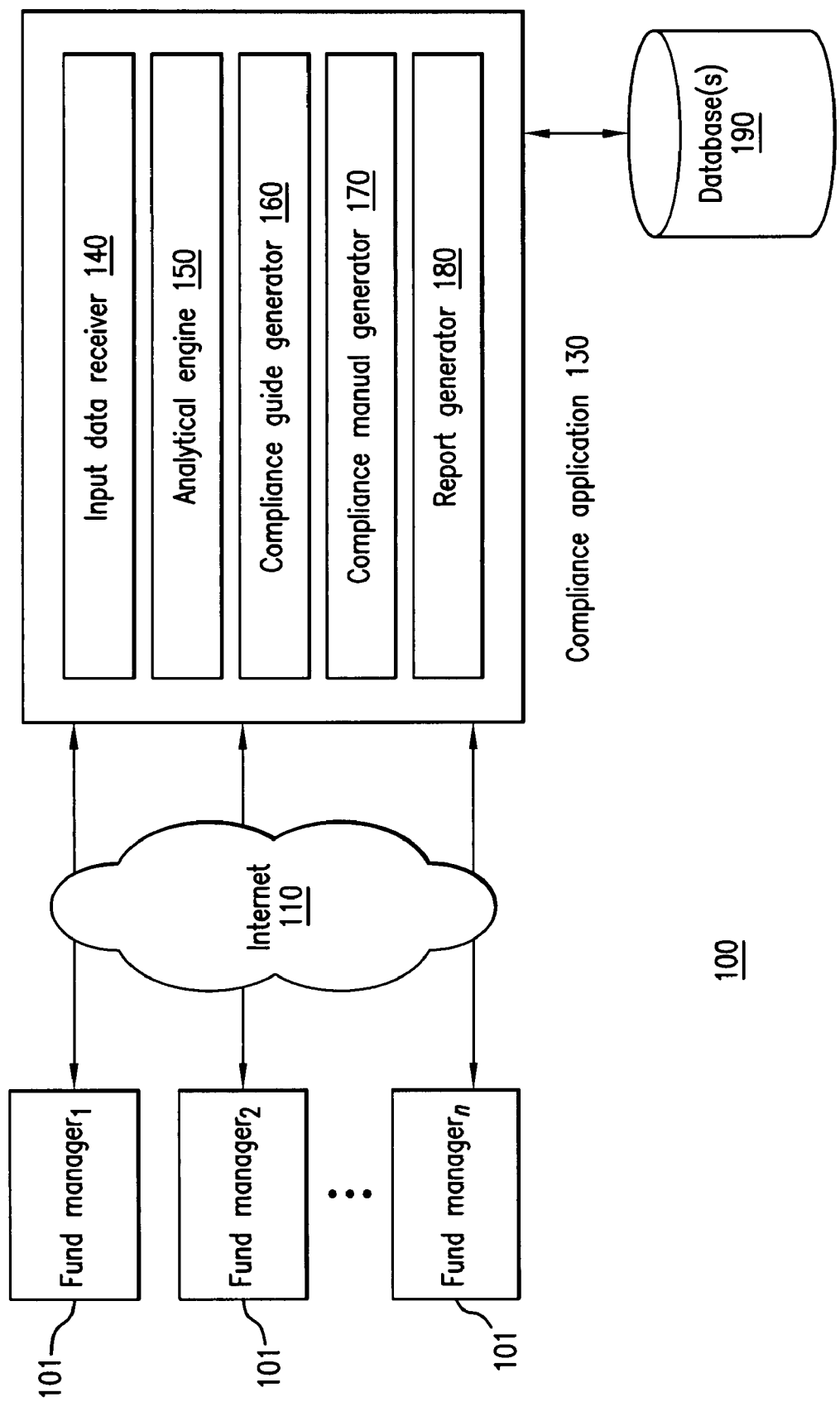
FIG. 1 shows a compliance system according to embodiments of the present invention.

FIG. 1 shows a compliance system 100 according to various embodiments of the present invention. The compliance system 100 includes one or more fund managers 101, a compliance application 130, and one or more databases 190. Each fund manager 101 may be an individual person or an entity engaged in a fund management operation. In an embodiment, the compliance application 130 may be deployed as an Internet-based service having one or more graphical user interfaces (GUI) by which each fund manager 101 may interact with the compliance application 130 remotely via the Internet 110 using a client computer (not shown). In other embodiments, each fund manger 101 may have associated therewith one or more local computers for deployment and use of the compliance application 130. For example, the one or computers local to a particular fund manger 101 may have an associated GUI by which the fund manager 101 may interact with the compliance application 130. Alternatively, the fund manager 101 may interact with the compliance application 130 using a GUI associated with a client computer wherein the client computer is in communication with the one or more local computers via an intranet. In an embodiment, each fund manager 101 may be required to enter a unique username and password and/or personal identification number (PIN) in order to gain access to functions of the compliance application 130 and information contained therein. In an embodiment, the fund manager 101 may be charged, on a subscription basis, to access functions of the compliance application 130 and information contained therein.

The compliance application 130 of FIG. 1 may include an input data receiver 140, an analytical engine 150, a compliance guide generator 160, a compliance manual generator 170, and a report generator 180. It is to be understood that some embodiments may not include each of these components. For instance, an embodiment may include a report generator 180, but not a compliance guide generator 160 and/or compliance manual generator 170.

The input data receiver 140 may receive data that, among other things, describes one or more informational aspects of a fund management operation corresponding to a particular fund manager 101. Examples of these one or more informational aspects are discussed hereinbelow from the standpoint of a single fund manager 101, although it may be appreciated that more or fewer of the discussed aspects may be applicable to other fund managers 101.

Various aspects of the data received by the input data receiver 140 may relate to general fund management operation information such as, for example, the legal name, address, and contact information of the fund manager 101, the fund manager's 101 short form name reference, the name and title of the fund manager's 101 managing member/CEO/president, the name and title of the fund manager's compliance officer, the name and title of the fund manager's 101 investment contact person, the fund manager's 101 legal business entity form, and the fund manager's 101 state or other country of jurisdiction or formation.

Various aspects of the data received by the input data receiver 140 may relate to more specific information about the fund manager 101 such as, for example, the fund manager's 101 regulatory registrations (state, federal, CFTC/NFA, and/or others), and the nature of the fund manager's 101 advisory services.

Various aspects of the data received by the input data receiver 140 may relate to fund-level information pertaining to one or more funds managed by the fund manager 101. For each managed fund, the fund-level information may include information of an administrative nature such as, for example, the fund's name, its legal business entity and state or other county of jurisdiction or formation, as well as the names and addresses of the fund's administrators, legal counsel and auditors/accountants. The fund-level information may additionally include information relating to one or more operational details of each fund, such as, for example, the type of fund and the nature of its investment strategy, particular legislative and/or regulatory provisions governing the fund's operation, and the basis for determining the fund manager's 101 compensation.

Various aspects of the data received by the input data receiver 140 may relate to information describing the nature of the fund manager's 101 fund management operation. Such information may include, for example, information relating to the nature of the fund manager's 101 investment advisory/asset management business, information relating to existing and/or desired employee monitoring policies, information relating to the nature of the advice provided to advisory clients, information relating to registration of the fund manager 101 or its affiliates as a broker-dealer, information relating to any ERISA or benefit plans accounts and/or investment funds managed by the fund manager 101, information relating to trade aggregation and allocation procedures of the fund manager 101, information relating to the sharing of non-public personal information of advisory clients or investors by the fund manager 101, information relating to disaster recovery and/or emergency procedures of the fund manager 101, information relating to reserved rights of the fund manager 101 to vote proxies related to investments held by advisory clients, information relating to members of the fund manager's portfolio management/investment team having the authority to make investments decisions or portfolio allocations for the fund manager's 101 advisory clients, and/or information relating to employees of the fund manager 101 who are authorized to submit trading orders. The information may further include information relating to the distribution of fund management materials to access persons and other employees of the fund manager 101. An access person may be, for example, any partner, officer, director or any employee of the fund manager 101 who, in connection with his or her regular functions or duties, makes, participates in or obtains information regarding the purchase or sale of securities or whose functions relate to the making of any recommendations with respect to purchases or sales. An access person may also be any of the following persons who obtain information concerning recommendations being made by the fund manager 101 or information concerning such recommendations: any person in a control relationship to the fund manager 101, any affiliated person of such controlling person, and any affiliated person of such affiliated person.

It may be appreciated that the above-described informational aspects of the received data are provided by way of example only, and that it may be desirable to include other informational aspects of fund management operation within the received data.

Figure 2:
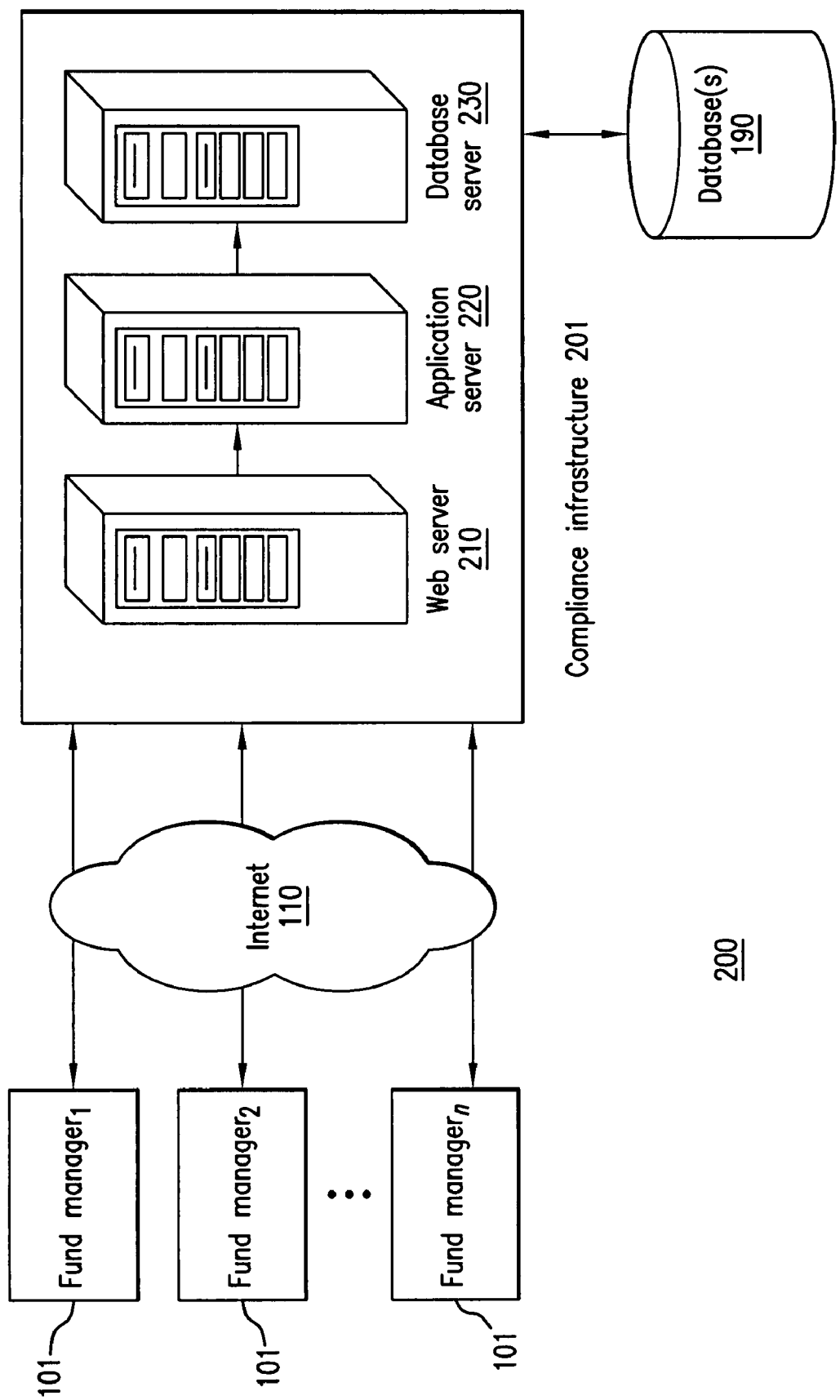
FIG. 2 shows a compliance system according to embodiments of the present invention.

FIG. 2 shows a compliance system 200 according to an embodiment of the present invention. The system 200 depicts an implementation of the compliance system 100. One or more fund managers 101 may interact with a compliance infrastructure 201 having a distributed server architecture via the Internet 110. The distributed server architecture of the compliance infrastructure 201 may include, for example, a web server 210 for providing, among other things, web-based GUI functionality, an application server 220 for performing one or more program services, and a database server 230 in communication with the one or more databases 190 for performing data retrieval and/or storage tasks in response to requests received from the web server 210 and/or the application server 220. It may be appreciated that, in other embodiments, more or fewer servers 210, 220, 230 may be employed. For example, the functions of the application server 220 and the database server 230 may be performed by one server. Alternatively, one or more of the servers 210, 220, 230 may have one or more identical backups in order to add a desired level of operational redundancy.

According to various embodiments, the web server 210, the application server 220, and the database server 230 may be one of a variety of well-known conventional general-purpose computer systems such as, for example, microprocessor or micro-controller-based systems, multiprocessor-based systems, programmable devices, personal computers operating in a stand alone or networked environment (e.g., LAN, WAN, Client-Server, CORBA, Internet, etc.), minicomputers, mainframes, and the like. Each server may be, for example, a network-configured computer utilizing the dual Intel® Xeon™ processor architecture and having conventional computer components such as, for example, random access memory (RAM), one or more hard discs, optical disks, and/or floppy disk drives, a monitor, and one or more interface devices (e.g., a mouse and a keyboard) connected thereto. Although various embodiments of the present invention may be described as being implemented in a suitable computing environment, the above-listed conventional computer components and others are not described in detail herein, as such conventional computer components and their functions are well within the knowledge of those skilled in the art.

In an embodiment, the web server 210 may provide web-based GUI functionality using, for example, the Microsoft® Internet Information Services (MIIS) software package. In an embodiment, the application server 220 may perform program services using a variety of software packages that may include, for example, one or more software packages for performing services associated with the compliance application 130 described hereinbelow, an Adobe Acrobat Writer software package for document processing/creation, and a Microsoft® Office 2000 software package for document processing/creation and/or data manipulation. In an embodiment, the database server 230 may provide data retrieval and storage functionality using, for example, the Microsoft® SQL Server software package.

In an embodiment, the received data corresponding to a fund management operation of a particular fund manager 101 may be provided by the fund manager 101 in response to a questionnaire associated with the input data receiver 140 of the compliance application 130. The questionnaire may contain questions crafted to elicit one or more of the above-described informational aspects and be accessible to the fund manager 101 via the Internet 110. As noted above, the compliance application 130, according to other embodiments, may be installed on one or more computers local to the fund manager 101. In such other embodiments, the questionnaire may be accessible without use of the Internet 110.

Figure 3:
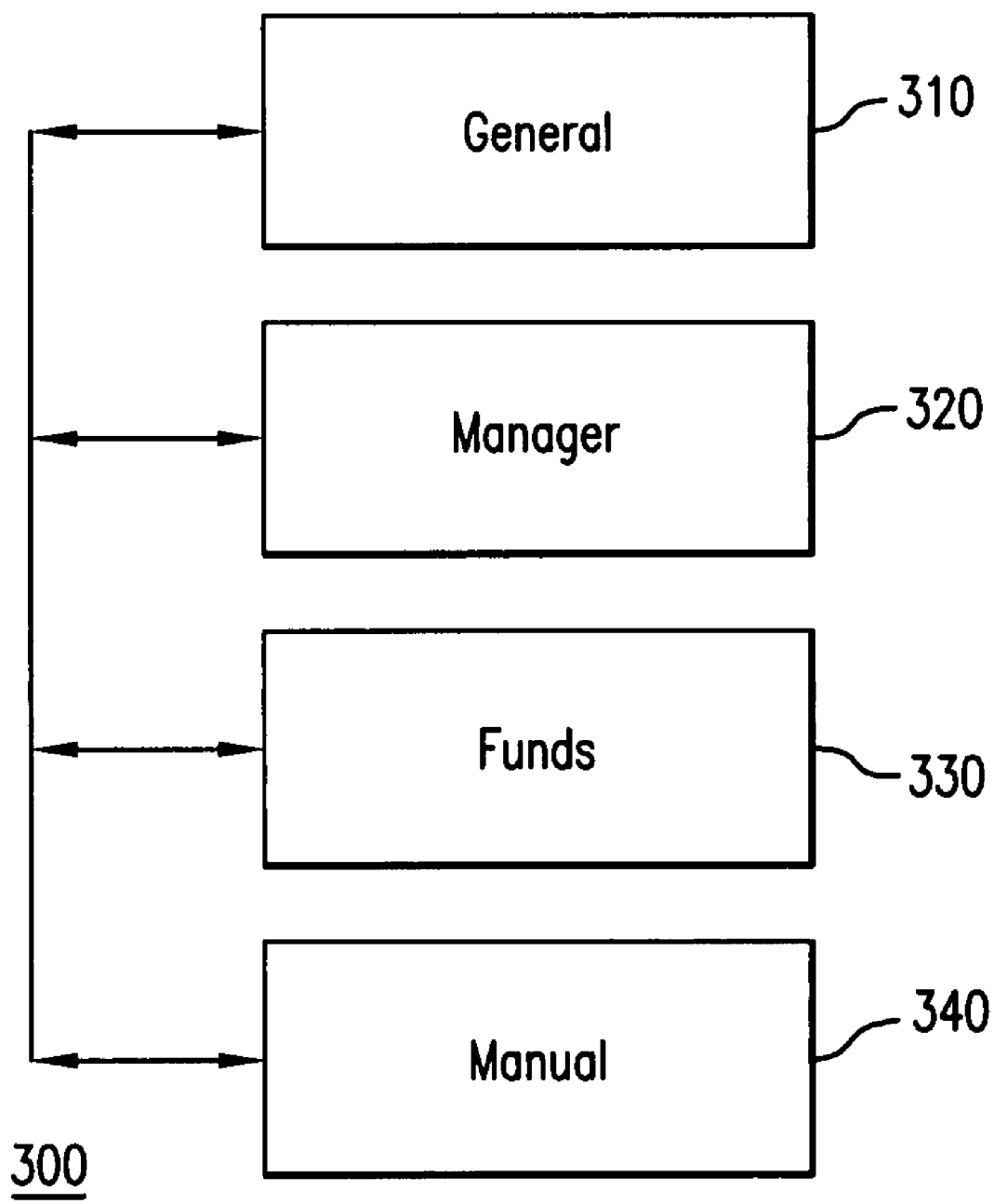
FIG. 3 illustrates a categorical organization of a web-based questionnaire according to embodiments of the present invention.

FIG. 3 illustrates a categorical organization of a web-based questionnaire 300 according to embodiments of the present invention. The web-based questionnaire 300 may include one or more web-based GUI screens 310, 320, 330, 340 for receiving answers from the fund manager 101 responsive to one or more questions displayed thereon. Some questions may be multiple-choice questions wherein the fund manager 101 is required to select one of several possible answer choices. Some questions may require "yes" or "no" answers, while others may require the fund manager 101 to answer with manually-entered information such as, for example, names, addresses, funds managed, and the like. The web-based GUI screens 310, 320, 330, 340 may be selectively displayed by the fund manager 101 and correspond in number to the different informational aspects comprising the received data. For example, the first web-based GUI screen 310 may contain the label "General" and display questions for eliciting information of a general nature. The second web-based GUI screen 320 may contain the label "Manager" and display questions for eliciting more specific information about the fund manager. The third web-based GUI screen 330 may contain the label "Funds" and display questions for eliciting information pertaining to one or more managed funds. The fourth web-based GUI screen 340 may contain the label "Manual" and display questions for eliciting information concerning the nature of the fund manager's 101 firm. It may be appreciated that more or fewer web-based GUI screens 310, 320, 330, 340 may be included in the questionnaire 300 based on the number of informational aspects comprising the received data and/or the desired organization of the one or more questions.

In various other embodiments, data from the fund manager 101 may be received by the input data receiver 140 in the form of one or more data files that contain information describing aspects of the fund management operation identical or similar to those discussed above.

Operation of the analytical engine 150 of FIG. 1 according to various embodiments is now described. The analytical engine 150 may analyze received data to determine, among other things, a set of federal and/or state regulations applicable to the fund operation of the fund manager 101. Analyzing received data may include categorizing some or all of the received data according to one or more of the informational aspects discussed above to determine a framework of relevant regulatory issues and related procedures to be examined by the fund manager 101. Based upon its analysis, the analytical engine 150 may store the received data to specific data tables located in the one or more databases 190 in a manner that represents the relevancy and/or logical relationship of the received data to each managed fund, to the fund manager 101, and to any regulatory issues implicated. As discussed hereinbelow, the data tables may be accessed by components of the compliance application 130 in order to generate one or more customized informational products. Because the data received by the input data receiver 130 may be subsequently edited to correct errors or updated to reflect changing circumstances of the fund management operation, changes made to the received data may be monitored within the compliance application 130 to ensure that appropriate revisions to previously-generated customized informational products are promptly generated and made available to the fund manager 101. Similarly, changes to laws and/or regulations may also trigger the generation of updated customized informational products using received data that was previously stored.

Subsequent to the analysis and storage of the received data by the analytical engine 150, the compliance application 130 may generate a notification for a verification request. According to an embodiment, the notification for a verification request may be an email. The notification for a verification request may be received by an administrator of the compliance application 130 having expertise in compliance issues who then may verify the accuracy and/or integrity of the received data stored by the analytical engine 150.

The compliance guide generator 160, compliance manual generator 170, and/or report generator 180 may generate customized informational products based on received data as analyzed and stored by the analytical engine 150. Each customized information product may be stored to one or more electronic files. In an embodiment, the files may be portable document format (.pdf) files, for example, created using the PDF Distiller software package available from Adobe Systems, Inc. In various embodiments, the one or more electronic files containing a customized informational product may be communicated via the Internet 110 to a client computer associated with the fund manager 101 and subsequently accessed therefrom. In another embodiment, the one or more electronic files containing a customized informational product may be stored within the compliance application 130 and be remotely accessed by the fund manager 101 via the Internet 110. The one or more electronic files containing a customized informational product may be stored to one or more compact discs or similar information storage device and mailed to the fund manager 101. The information contained in the one or more electronic files corresponding to a customized informational product may be printed by the compliance application 130 and shipped to the fund manager 101 in hardcopy.

Operation of the compliance guide generator 160 of FIG. 1 according to various embodiments of the present invention is now described. In response to a first fund manager 101 request, the compliance guide generator 160 may retrieve and analyze all or a portion of the received data previously analyzed and stored by the analytical engine 150 in order to identify, among other things, compliance issues of particular relevance to the find manager 101 and recommended and/or required procedures for addressing each issue. As part of its analysis function, the compliance guide generator 160 may also check to verify that an administrator of the compliance application 130 has previously verified the retrieved data. The compliance guide generator 160 may further compile and format the identified information into a compliance guide that is subsequently provided to the fund manager 101. Relevant compliance issues identified by the compliance guide generator 160 may include investor-level and/or fund-level compliance issues such as, for example, investor eligibility compliance issues, 3(c)(1) beneficial owner counting compliance issues, benefit plan compliance issues, portfolio-related compliance issues, Patriot Act and/or anti-money laundering (AML) compliance issues, website-related compliance issues, and Blue Sky filing compliance issues. Relevant compliance issues identified by the compliance guide generator 160 may also include manager-level compliance issues such as, for example, federal and state investment advisor registration requirements, record-keeping and filing requirements, compliance issues applicable to SEC-registered find managers, compliance issues relevant to registered and unregistered investment advisors, compliance issues relevant to CFTC-registered fund managers, website-related compliance issues, privacy policy compliance issues, filing issues related to the Securities and Exchange Act of 1934, and regulatory issues related to the sale of fund interests.

In addition to identifying particularized compliance issues, the compliance guide generator 160 may also identify generally relevant compliance issues and procedures for inclusion into the compliance guide. Aspects of this general information may include, for example, an overview of generally relevant laws and regulations, as well as an overview of regulatory agencies with which the fund manager 101 may interact. Other aspects of this general information may include, for example, information relating to general work place tips and suggested controls that may be implemented by the fund manager 101, information relating to methods for streamlining fund operational activities, information relating to material business contracts that may relate to the fund manager's 101 business, information relating to compliance and business reminder calendars/fund summaries, information relating to audit preparation recommendations/infrastructure, and information relating to operating procedures for addressing information, technology, and telecommunication issues.

Based on the identified investor-level and manager-level compliance issues, the compliance guide generator 160 may further identify for inclusion into the compliance guide one or more customizable exhibits. The customizable exhibits may include, for example, forms for distributing and obtaining client/customer information, for performing internal fund management operations, for providing information to legal counsel, and for providing information in response to inquiries from regulatory authorities. The identified customizable exhibits may contain one or more information fields for receiving information. In an embodiment, the compliance guide generator 160 may automatically supply some or all of the information necessary to complete the one or more information fields. In another embodiment, the fund manager 101 may supply some or all of the information necessary to complete the one or more information fields.

The above-described steps of identifying, compiling, and formatting the compliance guide content, collectively referred to as "compliance guide customization," are now described according to various embodiments. The compliance guide generator 160 may first load a general compliance guide template associated with the compliance application 130 that contains all possible compliance guide provisions. All possible compliance guide provisions may include, for example, provisions addressing the specific compliance issues and general compliance issues discussed above, as well as provisions containing the customizable exhibits discussed above. Next, based upon the fund manager's answers to questions in the questionnaire 300 as embodied within the received data, the compliance guide generator 160 may compile one or more highlights summary pages that indicate which sections of the compliance guide are applicable to the particular facts of the find manager 101, as indicated in the fund manager's answers to questions in the questionnaire 300. The highlights summary pages are provided to the fund manager 101, together with all of the possible compliance guide provisions. Alternatively, the compliance guide generator 160 may compile and edit the compliance guide by deleting from the general compliance guide template those provisions deemed to be irrelevant pursuant to the fund manager's answers, while retaining those provisions identified as relevant.

As noted earlier, the compliance guide (or the general compliance guide template) may be provided to the fund manager 101 in a variety of formats. In one embodiment, for example, the compliance guide may be provided as a portable document format (.pdf) file that is created by the compliance application 130 using the "PDF Distiller" software package available from Adobe Systems, Inc. and then communicated to a client computer associated with the fund manager 101.

Operation of the compliance manual generator 170 of FIG. 1 according to various embodiments of the present invention is now described. In response to a second fund manager 101 request, the compliance manual generator 170 may retrieve and analyze all or a portion of the received data previously analyzed and stored by the analytical engine 150 in order to identify, among other things, one or more written procedures to be observed by the fund manager 101 in order to promote compliance with the regulatory requirements specific to the fund manager's 101 operation. As a part of its analysis function, the compliance manual generator 170 may also check to verify that an administrator of the compliance application 130 has previously verified the retrieved data. The compliance manual generator 170 may further compile and format the identified written procedures into a customized compliance manual that is subsequently provided to the fund manager 101. Written procedures identified by the compliance manual generator 170 may include procedures such as, for example, record keeping procedures, personal trading procedures, Patriot Act and/or AML procedures, disaster recovery procedures, procedures for detecting and/or preventing insider trading, procedures for ensuring compliance with ethical requirements, procedures relating to administration of brokerage/placement fee policies, procedures relating to principal and agency cross transactions, procedures relating to ERISA investment policies, and procedures relating to proxy voting. The compliance manual generator 170 may also identify a set of industry best practice standards to be observed by employees of the fund manager 101 involved in fund management. Because the fund manager 101 may manage multiple funds, the compliance manual generator 170 may be used to generate a compliance manual for each fund managed.

The above-described steps of identifying, compiling, and formatting the one or more procedures to be followed by the fund manager 101 based upon the received data, collectively referred to as "compliance manual customization," are now described according to various embodiments. Based upon the fund manager's 101 answers provided in response to questions contained on the second and fourth web-based GUI screens 320, 340 ("Manager" and "Manual" screens, respectively) of the questionnaire 300 discussed above in connection with FIG. 3, one of multiple (e.g., eight) possible manual types may be identified as a "best fit" for the fund manager 101. In an embodiment, the answers to two multiple-choice questions may be used to identify one of the eight possible manual options based a comparison of the answers to a set of industry best practice standards.

The first question, MG1, may appear on the second web-based GUI screen 320 and read as follows: "Is the manager registered as an investment advisor with the SEC, a state or not registered with either? (if state registered, please supply name of state)." Question MG1$a$ refers to the SEC and has the date of SEC registration. One of three possible answers to question MG1, answers MG1$a$-$c$, may be selected by the fund manager 101. Answer MG1$a$ may specify SEC registration and date of SEC registration, answer MG1$b$ may specify state registration and the state of registration, and answer MG1$c$ may specify that the fund manager 101 is not registered.

The second question, M1, may appear on the fourth web-based GUI screen 340 and read as follows: "How would you best describe the manager's investment advisory/management business?" One of five possible answers to question M1, answers M1$a$-$e$, may be selected by the fund manager 101. Answer M1$a$ may provide "manager provides investment management services to direct investment funds only (no fund of funds or separate plan accounts);" answer M1$b$ may provide "manager provides investment management services to direct investment funds and separate client accounts that make direct investments in stocks, bonds and other financial instruments (no fund of funds or separate client accounts, which primarily invest in funds only);" answer M1$c$ may provide "manager provides investment management services to fund of funds only (no direct investment funds or separate client accounts);" answer M1$d$ may provide "manager provides investment management services to funds of funds and separate client accounts that primarily invest in other funds (no direct investment funds or separate client accounts that primarily invest in stocks, bonds, or other financial instruments);" and answer M1$e$ may provide "none of the above applies—a compliance professional will contact you to help determine how to best develop your manual."

As noted above, the correspondence between the answers to questions MG1 and M1 and the manual options may be specified according to a set of industry best practice standards. Thus, for example, selection of answer combination ((MG1$a$ or MG1$b$) and M1$d$) may cause the first manual option to be identified; selection of (MG1$c$ and M1$d$) may cause the second manual option to be identified, and so forth.

According to an embodiment, after the manual option has been identified, manual generation logic driven by the answers to the other questions provided in the fourth web-based GUI screen 340 may be used to dynamically customize the selected manual option. For example, the manual option as selected above may be general, comprising a library of text containing all possible manual provisions. Based on the answers to the questions on the fourth web-based GUI screen 340, irrelevant sections of the selected manual option may be deleted from the library of all possible manual provisions, and/or relevant information may be inserted and/or appended. For example, according to the above embodiment in which the first of eight manual options has been selected, a portion of the manual generation logic may specify that if the answer to a question M2$a$ of the fourth web-based GUI screen 340 is "yes," then a field 13 of the first manual option should be deleted. Alternatively, if the answer to the question M2$a$ is "no," for example, then the portion of the manual generation logic may specify that fields 6, 14, and 15 should be deleted and field 13 kept. When selected, each possible answer for each question may cause the appropriate manual provisions in the library of all possible manual provisions comprising a particular manual option to be included or deleted from the compliance manual and/or the appropriate information added thereto. This relationship between questionnaire 300 answers and selected manual provisions and added information is the logic of the manual customization. Using the answers to the questions on the fourth web-based GUI screen 340, the complete customized compliance manual is thus generated for the fund manager 101. As noted earlier, the compliance manual may be provided to the fund manager 101 in a variety of formats. In one embodiment, for example, the compliance manual may be provided as a portable document format (.pdf) file that is created by the compliance application 130 using the "PDF Distiller" software package available from Adobe Systems, Inc. and communicated to a client computer associated with the fund manager 101.

Operation of the report generator 180 of FIG. 1 according to various embodiments of the present invention is now described. In response to a third fund manager 101 request, the report generator 180 may retrieve and analyze all or a portion of the received data previously analyzed and stored by the analytical engine 150 and/or other information entered by the fund manager 101, to generate one or more customized compliance reports responsive to one or more reporting requirements of the fund manager 101. Reporting requirements of the fund manager 101 may include, for example, the requirement to track fund investors and fund statistics for one or more funds, the requirement to generate monthly and quarterly reports demonstrating regulatory compliance, and/or the requirement to generate investor letters and investor eligibility questionnaires. Compliance reports produced in response to these and other reporting requirements may satisfy regulatory reporting requirements such as those imposed by the Patriot Act, as well as the internal reporting needs of the fund management operation.

Figure 4:
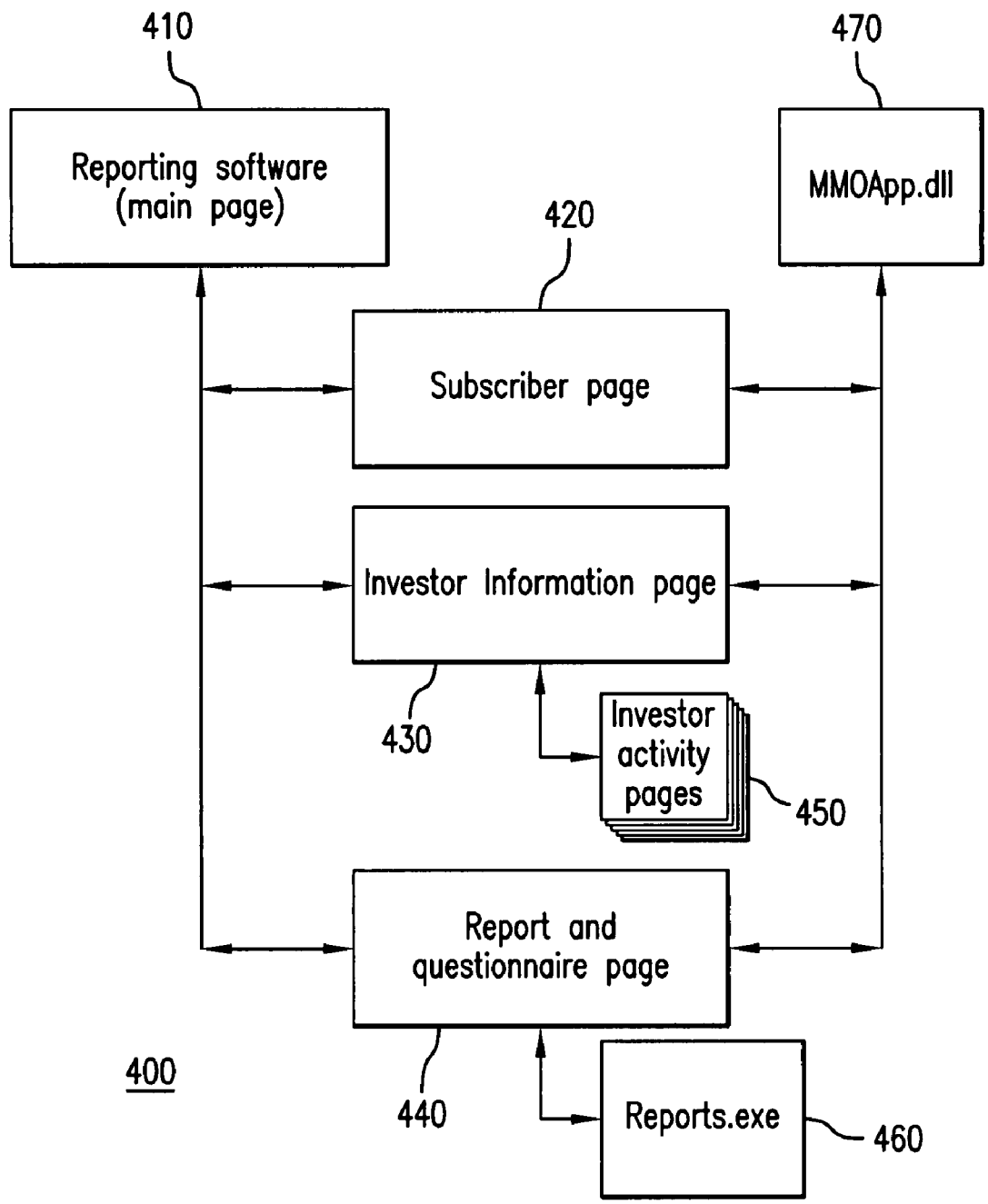
FIG. 4 illustrates a categorical organization of a web-based GUI associated with the report generator of FIG. 1 according to embodiments of the present invention.

In an embodiment, the fund manager 101 may provide information relating to its particular reporting requirements to the report generator 180 using a GUI that is accessible to the fund manager 101 via the Internet 110. FIG. 4 illustrates a categorical organization of a web-based GUI 400 associated with the report generator 180 according to an embodiment of the present invention. The web-based GUI 400 may include a first-level reporting software main page 410, as well as second-level reporting software pages that include a subscriber page 420, an investor information page 430, and a compliance reports, reminders, and questionnaire generator ("reporting and questionnaire") page 440. Each of the second-level reporting software pages may further include one or more subsidiary reporting software pages associated therewith. For example, the investor information page 430 may include one or more subsidiary investor activity pages 450. A report generator executable module 460 comprising various report engines (not shown) for generating the one or more requested reports, and a dynamically linked proprietary library of forms and reports 470 for structuring and organizing report content may be controlled and/or accessed via one or more of the pages comprising the web-based GUI 400.

When first accessing the web-based GUI 400, the fund manager 101 may be directed to the reporting software main page 410 from which the subscriber page 420, the investor information page 430, the reporting and questionnaire page 440, and one or more subsidiary pages may be selected.

The subscriber page 420 may display a list of funds managed by the fund manager 101 and one or more major informational aspects relating to each listed fund such as, for example, the fund's name, the nature of the fund's strategy, domestic/offshore status of the fund, the fund's 3(c)(1)/3(c)(7) classification, and/or the total fund assets under management. A comprehensive list of the informational aspects relating to a listed fund may be displayed by selecting the fund from the displayed list. Displayed informational aspects relating to the selected fund may include the fund-level aspects discussed above in connection with the data received by the input data receiver 140 of FIG. 1, as well as others. In an embodiment, the listed funds and/or the informational aspects relating to each fund may be partly or wholly derived from the received data previously analyzed and stored by the analytical engine 150. In another embodiment, one or more of the listed funds and the informational aspects relating to each may be entered directly into one or more data input fields associated with the subscriber page 420, stored to the one or more databases 190, and retrieved as needed. According to such embodiments, the displayed information may be edited and/or updated using the data input fields associated with the subscriber page 420.

The investor information page 430 may display a list of investors for each fund managed by the fund manager 101 and one or more general informational aspects relating to each such as, for example, investor type, active/inactive status, and investment balance. In an embodiment, the list of investors displayed for a particular fund may be filtered and/or sorted according to a class of interest of each investor in the fund. Functions available to the fund manager 101 from the investor information page 430 may include an investment account updating function wherein the fund manager 101 may update account balances for multiple investors, and an investor list cross checking function wherein the fund manager 101 may automatically compare each investor listed to one or more governmental watch lists and be alerted to any matches. The investor list cross checking function may be implemented using a commercially available software package such as, for example, the Bridger Insight™ software package available from Bridger Systems$^{SM}$, Inc.

A comprehensive list of informational aspects relating to a listed investor may be displayed by selecting the investor from the displayed list. Displayed informational aspects relating to the selected investor may include, for example, the investor's name, address, country and/or state of domicile, phone and facsimile numbers, email address, account number, and the name of the investor's contact person. Other displayed informational aspects relating to the selected investor may include the investor's tax identification and/or social security number, the date of the investor's admission to the fund, and the investor's account balance. It may be appreciated that the above-described informational aspects are provided by way of example only, and that it may be desirable to include other informational aspects relating to the selected investor.

In an embodiment, each investor listed on the investor information page 430 and one or more informational aspects relating to each may be directly entered, edited, and/or updated using one or more data input fields associated with the investor information page 430 and stored to the one or more databases 190. Because one or more of the displayed informational aspects relating to an investor may be calculated based on other informational aspects, some informational aspects may not be entered, edited and/or updated directly. Such informational aspects may include, for example, ERISA/IRA percentages for an investor and the total percent of fund assets held by an investor.

The one or more investor activity pages 450 that may be associated with the investor information page 430 and accessible therefrom may display informational aspects relating to an account activity for each investor listed on the investor information page 430. Using the one or more investor activity pages 450, the fund manager 101 may monitor the account activity of an investor to detect suspicious transactions and/or to ensure that the investor's transactions otherwise comply with regulatory requirements. The account monitoring function may be implemented using a commercially available software package such as, for example, the Bridger Insight™ software package available from Bridger Systems$^{SM}$, Inc.

Informational aspects relating to an account activity of an investor may include, for example, the type of investment activity, the method of investment, the date the activity took place, the name of the institution that wired funds and its country of jurisdiction, and the amount of investment activity. In an embodiment, the informational aspects relating to account activity for each investor may be entered, edited and/or updated using one or more data input fields associated with the investor activity pages 450, stored to the one or more databases 190, and recalled as needed by the fund manager 101.

The reporting and questionnaire page 440 may enable the fund manger 101 to generate one or more fund-level and/or manager-level reports, as well as questionnaires/letters aimed at addressing deficiencies in an investor's subscription materials based upon information previously supplied by the fund manager 101 via the subscriber page 420 and the investor information page 430. In an embodiment, the reporting and questionnaire page 440 may have one or more selectable categories of reports associated therewith such as, for example, monthly reports, quarterly reports, and questionnaires/letters. Selection of a category may cause to be displayed a list that includes one or more available reporting options included thereunder. From the list of reporting options, the fund manager 101 may select one or more of the reporting options for generation. In an embodiment, only the reporting options applicable to the fund manager 101 and/or the fund for which information is sought may be selected for generation.

Based on the one or more reporting options selected for generation, the fund manger 101 may be prompted to enter additional information into one or more reporting and questionnaire page 440 data input fields. The fund manger 101 may be prompted to enter, for example, the names of each fund for which a report is sought, the date of each report, and/or the desired reporting time frame. After any necessary additional information is provided by the fund manager 101, the report generator 180 may load appropriate report templates and/or report forms, replace and/or insert the necessary data, provide a watermark displaying the fund manager's 101 name, and/or send the generated reports and/or questionnaires to the fund manager 101.

In one embodiment, report generator module 180 may remind the fund manager 101 of the necessity of filing specific reports on schedule, if they may be scheduled. The reminders may be communicated to the fund manager 101 by email, regular paper mail, or otherwise.

Reporting options that may be available under each of the exemplary selectable categories noted above are now considered. Under the category of monthly reports, a first reporting option that may be available to the fund manager 101 is a new investor review report that lists all new investors admitted to a particular fund during a period specified by the fund manager 101. A second reporting option available under this category may be a 3(c)(1) beneficial owner count review report that determines the beneficial owner count for each investor in a fund and tallies up the total beneficial owner count for the fund. A third reporting option available under this category may be an ERISA/IRA/Non-U.S. benefit plan percent review report that calculates the percentage of ERISA investments taking into account investments made by the investment manager and/or its affiliates. A fourth reporting option available under this category may be an IRA percent review report that calculates the percentage of IRA investments in the fund (or class of interests in the case of a multi-class fund), taking into account investments made by the investment manager and/or its affiliates. A fifth reporting option available under this category may be a new issue participation review report that separates all of the investors in a given fund into new issue eligible and new issue restricted categories. A sixth reporting option available under this category may be an investment company percentage report that calculates the ownership percentage of all investment company investors, if any. A seventh reporting option available under this category may be an unaccredited investor participation report that lists the number of unaccredited beneficial owners of the fund. An eighth reporting option available under this category may be a Patriot Act/AML review report that alerts the fund manager 101 to prohibited and/or suspicious investment activities and/or flags any fund investors who appear on a government watch list. A ninth reporting option available under this category may be a new account activity report that tracks all new subscriptions, redemptions and transfers for the most recent quarter. A tenth reporting option available under this category may be a Blue Sky filing request that may be forwarded to a Blue Sky contact for the fund manager 101 to ensure proper Blue Sky compliance. The Blue Sky filing request may list all new investors admitted to the fund during a period specified by the fund manager 101, as well as the state of residence for each investor, the date of each investor's initial investment, and each investor's investment amount. Also included in the Blue Sky filing request may be the name and address of any investor in the fund having a fund ownership interest of greater than ten percent. An eleventh reporting option available under this category may be a controlled foreign corporation status report that lists all U.S. domiciled investors in a fund and the percent interest in the fund that they hold. The controlled foreign corporations status report also lists the ownership percentages, if any, of U.S. shareholders.

Under the category of quarterly reports, a first reporting option may be a portfolio filing review and recommendation report. The portfolio filing review and recommendation report may be generated as a form, completed by member of a portfolio management team of the fund manager 101, and used to determine if specific filings with the SEC are required. A second reporting option available under this category may be an employee pre-clearance summary report. The employee pre-clearance summary report may be generated as a form and completed by a compliance officer of the fund manager 101 to ensure that insider trading and personal trading procedures are observed by one or more employees of the fund manager 101. A third reporting option available under this category may be an employee personal transaction review report for listing, among other things, all new investments made by one or more access persons of the fund manager 101. The employee personal transaction review report may be generated as a form and completed by a compliance officer of the fund manager 101 based on security holding reports and employee personal brokerage account statements submitted by the one or more employees. A fourth reporting option available under this category may be a trade allocation review report listing all securities purchases made during a time period specified by the fund manager 101 by advisory clients of the fund manager 101. A fifth reporting option available under this category may be a soft dollars activities review report listing any soft dollar transactions reasonably believed to have not been sufficiently disclosed to investors and any soft dollar transactions believed to fall outside the safe harbor provided for in Section 28(e) of the Securities and Exchange Act of 1934, as amended. The soft dollars activities review report may be generated as a form and completed by a compliance officer of the fund manager 101. A sixth reporting option available under this category may be a record-keeping reminders for SEC registered fund managers report to facilitate compliance with record-keeping requirements imposed by Rule 204-2. The record-keeping reminders for SEC registered fund managers report may be generated as a form and completed by a compliance officer of the fund manager 101. A seventh reporting option available under this category may be a 13-F reminder report that reminds a compliance officer of the fund manager 101 of the date on which Form 13-F must be filed if the fund manager 101 is a Form 13-F filer. An eighth reporting option available under this category may be an offshore fund fee deferral reminder report. The offshore fund fee deferral reminder report may be generated as a form to be completed by a compliance officer of the fund manager 101 and forwarded to the fund's offshore administrator.

In an embodiment, where more than one reporting option is selected under a particular category, the selected options may be generated separately. In another embodiment, where more than one reporting option is selected under a particular category, the selected options may be compiled into one file for the category.

Under the questionnaire/letter category, a first reporting option may be a qualified client eligibility questionnaire and cover letter. The eligibility questionnaire may be generated as a form and sent with the cover letter to an investor for completion in order to ensure that the investor is a qualified investor for purposes of Rule 205-3 of the Advisors Act. A second reporting option available under this category may be a new issue questionnaire and cover letter. The new issue questionnaire may be generated as a form and sent with the cover letter to an investor for completion in order to determine whether or not the investor is eligible to participate in a fund's use of new issues securities. A third reporting option available under this category may be an accredited investor eligibility questionnaire and cover letter. The accredited investor eligibility questionnaire may be generated as a form and sent with the cover letter to an investor for completion in order to determine whether or not the investor is eligible to participate in a fund's use of new/hot issue securities. A fourth reporting option available under this category may be a qualified purchaser eligibility questionnaire and cover letter. The qualified purchaser eligibility questionnaire may be generated as a form and sent with the cover letter to an investor in a 3(c)(7) investment fund for completion in order to determine whether or not the investor is a qualified purchaser for purposes of the Investment Company Act. A fifth reporting option available under this category may be a qualified eligible person eligibility questionnaire and cover letter. The qualified eligible person eligibility questionnaire may be generated as a template and sent with the cover letter to an investor in a fund utilizing futures pursuant to CFTC Rule 4.7 in order to determine whether or not the investor is a qualified eligible person for purposes of CFTC Rule 4.7. A sixth reporting option available under this category may be an investment company status questionnaire. The investment company status questionnaire may be generated as a form and sent to an investor to determine whether or not the investor qualifies as an investment company. A seventh reporting option available under this category may be an investment company beneficial owner count questionnaire. The investment company beneficial owner count questionnaire may be generated as a form and sent to an investor who is an investment company to determine whether or not the investor owns greater than ten percent of a 3(c)(1) investment company.

According to various embodiments, the customized compliance guide, compliance manual, and reports/questionnaires may be stored for later access by the fund manager 101. Alternatively, these items may be generated at the time of access to the application by the fund manager 101 using received data previously analyzed and stored by the analytical engine 150.

Figure 5:
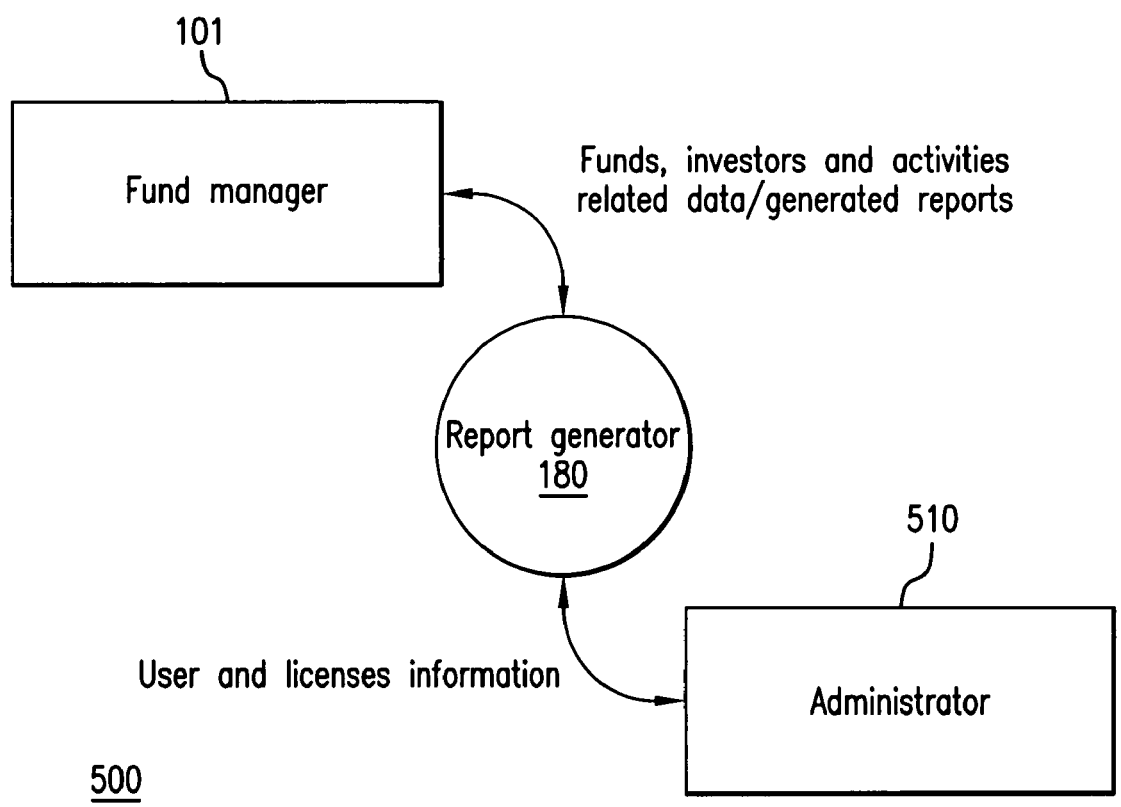
FIG. 5 shows a high-level data flow diagram implementation of the report generator of FIG. 1 according to embodiments of the present invention.

FIG. 5 shows a high-level data flow diagram 500 implementation of the report generator 180 of FIG. 1 according to embodiments of the present invention. As shown, a fund manager 101 and an administrator 510 may interact with the report generator 180. Information exchanged between the administrator 510 and the report generator 180 may include, for example, user and licenses information. Information exchanged between the fund manager 510 and the report generator 180 may include, for example, fund information, investor and investor activities data, and/or generated reports.

Figure 6:
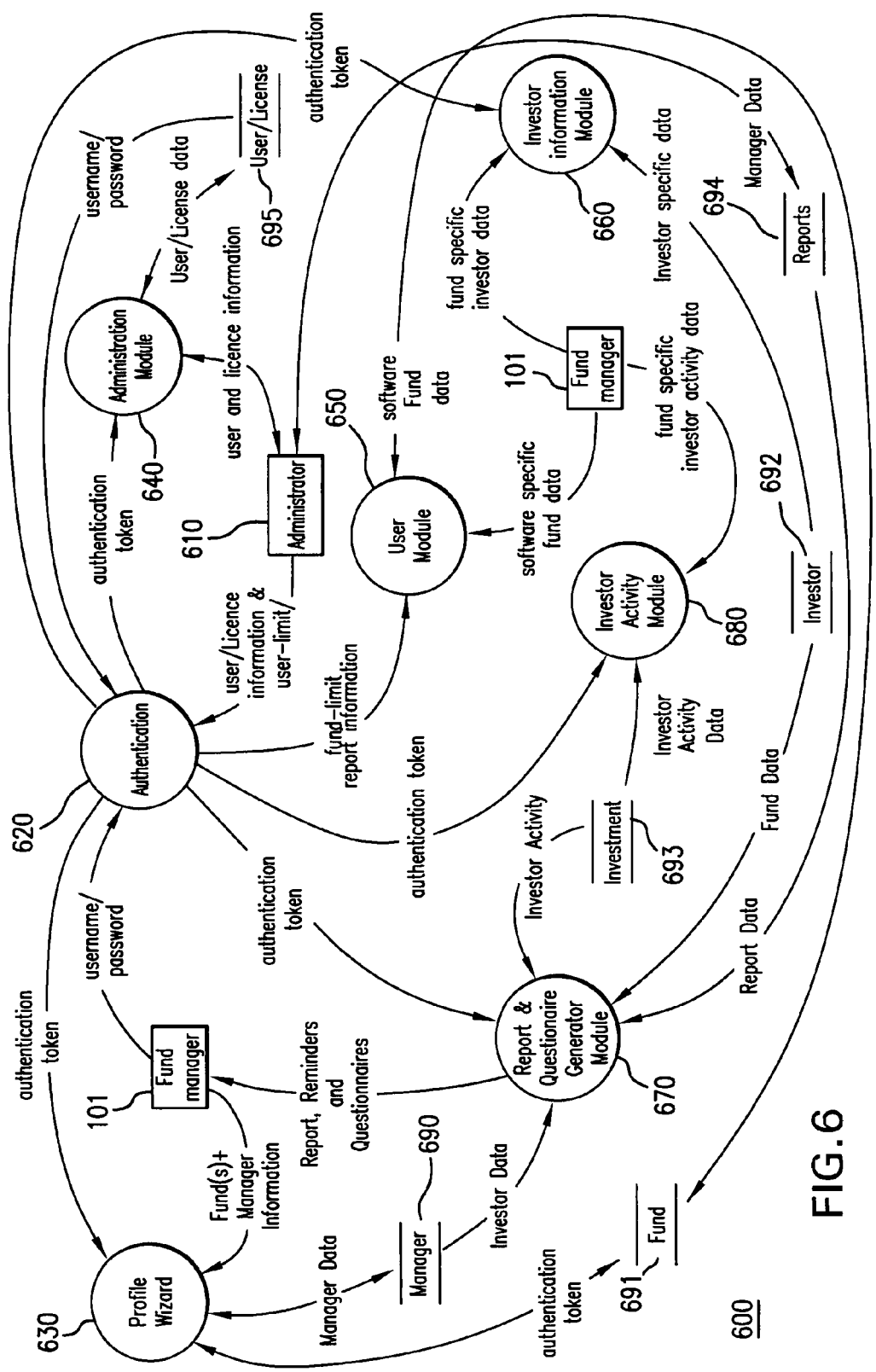
FIG. 6 shows a data flow diagram implementation of the report generator of FIG. 1 according to embodiments of the present invention.

FIG. 6 shows a data flow diagram 600 implementation of the report generator 180 of FIG. 1 according to embodiments of the present invention. As shown, a fund manager 101 and an administrator 610 respectively interact with various modules that comprise the compliance reporting software. The compliance reporting software, according to various embodiments, may be executed within the compliance infrastructure 210 of FIG. 2. As shown, the modules may include, for example, an authentication module 620 for providing access to the report generator 180 functionality based on a unique username and password associated with and entered by the fund manager 101, a profile wizard 630 for receiving and processing information relating to the fund manager 101 and funds managed thereby, and an administration module 640 for verifying, among other things, that the fund manager 101 is properly licensed user of the compliance reporting software. In an embodiment, the profile wizard 630 may prompt the fund manager 101 to complete the questionnaire 300 described in connection with FIG. 3. The report generator 180 may further include a user module 650, an investment information module 660, a report and questionnaire generator module 670, and an investor activity module 680 for providing the functionality underlying, respectively, the subscriber page 420, the investment information page 430, the report and questionnaire page 440, and the investor activity pages 450 described in connection with FIG. 4. Also shown in FIG. 6, the report generator module 180 may also include various data sources from which the above-described modules may retrieve and/or store information. The data sources may include, for example, a manager data source 690, a find data source 691, an investor data source 692, an investment data source 693, a reports data source 694, and a user/license data source 695. According to an embodiment, the data sources may be implemented as database tables contained within the one or more databases 190.

Figure 7:
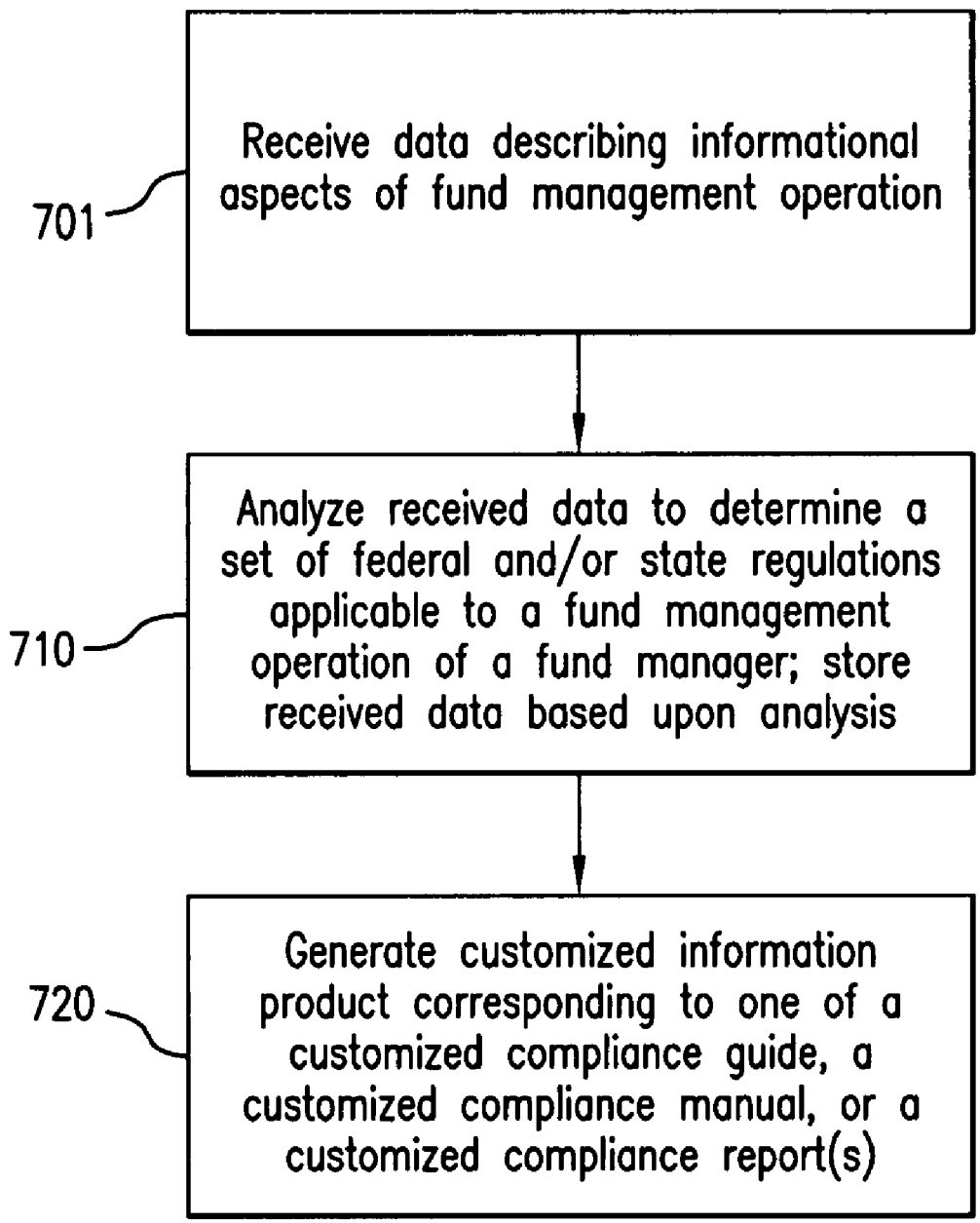
FIG. 7 shows a flowchart for a compliance process executed by a compliance application according to embodiments of the present invention.

FIG. 7 shows a flowchart for a compliance process 700 executed by a compliance application 130 according to an embodiment of the present invention. At step 701, a compliance application 130 may receive data describing one or more informational aspects of a fund manager 101 and the funds managed (collectively a fund management operation). At step 710, the compliance application 130 may analyze the received data to determine a set of federal and/or state regulations applicable to the fund management operation. At step 720, in response to a request received from the fund manager 101, the compliance application 130 may generate a customized informational product corresponding to one of a customized compliance guide, a customized compliance manual, or one or more customized compliance reports.

The foregoing description of the various embodiments of the present invention is provided to enable any person skilled in the art to make and use the present invention and its embodiments. Various modifications to these embodiments are possible, and the generic principles presented herein may be applied to other embodiments as well.

It will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention.

What is claimed is:

1. An interactive computer-based method for facilitating the development and maintenance of internal hedge fund compliance for hedge fund managers, the method comprising:

generating internal data from sources within a hedge fund operation;

receiving the internal data as input data descriptive of one or more aspects of the hedge fund operation related to compliance and regulatory requirements, the hedge fund operation including a hedge fund manager;

with a computer, analyzing the received input data, wherein the analyzing includes determining one or more of a law, regulation, or industry standard applicable to internal compliance issues related to the one or more aspects of the hedge fund operation based on the received input data and categorizing some or all of the received input data according to the one or more aspects of the hedge fund operation; and with the computer and based on the step of analyzing, generating each of:

a compliance guide for hedge fund managers which is customized in accordance with the one or more aspects of the hedge fund operation, wherein the compliance guide identifies compliance issues related to a particular hedge fund operation;

an internal compliance manual for hedge fund managers customized in accordance with the one or more aspects of the hedge fund operation, the compliance manual including at least one written procedure for the hedge fund operation, wherein the compliance manual describes detailed procedures for hedge fund managers; and an internal compliance report for hedge fund mangers customized in accordance with the one or more aspects of the hedge fund operation, wherein the compliance report is generated by the hedge fund manager for addressing compliance and regulatory requirements applicable to the hedge fund manager.

2. The method of claim 1, wherein receiving the input data includes receiving the input data via a graphical user interface.

3. The method of claim 2, wherein the graphical user interface is a web-based graphical user interface.

4. The method of claim 2, wherein receiving input data includes receiving input data provided in response to a questionnaire presented via the graphical user interface.

5. The method of claim 4, wherein the one or more aspects of the hedge fund operation include at least one of the following:

an aspect relating to general fund operation;

an aspect relating to specific information about the hedge fund manager;

an aspect relating to fund-level information pertaining to one or more funds managed by the hedge fund manager; or an aspect relating to information describing the nature of the fund operation.

6. The method of claim 1, wherein generating the compliance manual includes generating information addressing at least one of record keeping procedures, personal trading procedures, anti-money laundering procedures, disaster recovery procedures, procedures for detecting and preventing insider trading, procedures for ensuring compliance with ethical requirements, procedures relating to brokerage and placement fee policies, procedures relating to soft dollar policies, procedures relating to principal and agency cross transactions, procedures relating to investment policies, or procedures relating to proxy voting.

7. The method of claim 1, further comprising charging a fee prior to the steps of receiving, analyzing, and generating.

8. The method of claim 1, further comprising requiring entry of a unique user name and password prior to the steps of receiving, analyzing, and generating.

9. The method of claim 1, wherein the step of generating further comprises deleting from a general compliance guide template those provisions deemed to be irrelevant to generate the customized compliance guide.

10. The method of claim 1, wherein the customized compliance guide comprises one or more highlight summary pages and a general compliance guide template, and wherein the general compliance guide template contains all possible compliance guide provisions.

11. A programmable computer system for facilitating hedge fund compliance for hedge fund managers, the system comprising:

an analytical engine for analyzing received internal input data descriptive of one or more aspects of a hedge fund operation, wherein the analysis includes a determination of one or more of a law, regulation, or industry standard applicable to internal compliance issues related to the one or more aspects of the hedge fund operation based on the received input data and a categorization of some or all of the received input data according to the one or more aspects of the hedge fund operation;

wherein the hedge fund operation includes a hedge fund manager;

a compliance guide generator for generating, based on the analysis of the analytical engine, a compliance guide for hedge fund managers which is customized in accordance with the one or more aspects of the hedge fund operation, wherein the compliance guide identifies compliance issues related to a particular hedge fund operation;

a compliance manual generator for generating, based on the analysis of the analytical engine, an internal compliance manual for hedge fund managers customized in accordance with the one or more aspects of the hedge fund operation, the compliance manual including at least one written procedure for the hedge fund operation, and wherein the compliance manual describes detailed procedures for hedge fund managers; and a report generator for generating, based at least in part on the analysis of the analytical engine, at least one internal compliance report for hedge fund managers customized for the one or more aspects of the hedge fund operation, wherein the compliance report is generated by the hedge fund manager for addressing compliance and regulatory requirements applicable to the hedge fund manager.

12. The system of claim 11, further comprising an input data receiver for receiving the input data.

13. The system of claim 12, wherein the input data receiver includes a graphical user interface for receiving the input data.

14. The system of claim 13, wherein the graphical user interface is a web-based graphical user interface.

15. The system of claim 13, wherein the graphical user interface is further for receiving the input data in response to a questionnaire displayed via the graphical user interface.

16. The system of claim 11, wherein the aspects of the hedge fund operation include at least one of the following:
an aspect relating to general fund operation;
an aspect relating to specific information about the hedge fund manager;
an aspect relating to fund-level information pertaining to one or more funds managed by the hedge fund manager; or
an aspect relating to information describing the nature of the fund operation.

17. The system of claim 11, wherein the compliance manual includes information addressing at least one of record keeping procedures, personal trading procedures, anti-money laundering procedures, disaster recovery procedures, procedures for detecting and preventing insider trading, procedures for ensuring compliance with ethical requirements, procedures relating to brokerage and placement fee policies, procedures relating to soft dollar policies, procedures relating to principal or agency cross transactions, procedures relating to investment policies, and procedures relating to proxy voting.

18. The system of claim 11, wherein the hedge fund manager is charged a fee prior to accessing at least one of the compliance guide generator, the compliance manual generator, or the report generator.

19. The system of claim 11, wherein the hedge fund manager is required to enter a unique user name and password prior to accessing at least one of the compliance guide generator, the compliance manual generator, or the report generator.

20. The system of claim 11, wherein the customized compliance guide is generated by deleting provisions deemed to be irrelevant from a general compliance guide template.

21. The system of claim 11, wherein the customized compliance guide comprises one or more highlight summary pages and a general compliance guide template, and wherein the general compliance guide template contains all possible compliance guide provisions.

22. A computer-readable medium encoded with a plurality of processor-executable instructions for:
generating internal data from sources within a hedge fund operation;
receiving the internal data as input data descriptive of one or more aspects of the hedge fund operation related to compliance and regulatory requirements, the hedge fund operation including a hedge fund manager;
analyzing the received input data, wherein the analyzing includes determining one or more of a law, regulation, or industry standard applicable to internal compliance issues related to the one or more aspects of the hedge fund operation based on the received input data and categorizing some or all of the received input data according to the one or more aspects of the hedge fund operation; and
based on the step of analyzing, generating each of;
a compliance guide for hedge fund managers which is customized in accordance with one or more aspects of the fund operation, wherein the compliance guide identifies compliance issues related to a particular hedge fund operation;
an internal compliance manual for hedge fund managers customized in accordance with one or more aspects of the fund operation, the compliance manual including at least one written procedure for the hedge fund operation, wherein the manual describes detailed procedures for hedge fund managers; and
an internal compliance report for hedge fund managers customized for the one or more aspects of the hedge fund operation, wherein the compliance report is generated by the hedge fund manager for addressing compliance and regulatory requirements applicable to the hedge fund manager.

* * * * *